April 5, 1955   E. WEBER ET AL   2,705,780
MATCHED RESISTANCE FILM TYPE WAVE GUIDE ATTENUATORS
Filed Nov. 2, 1946

Inventor
ERNST WEBER
JOHN EBERT

By Ralph B. Stewart
Attorney

United States Patent Office 2,705,780
Patented Apr. 5, 1955

2,705,780

MATCHED RESISTANCE FILM TYPE WAVE GUIDE ATTENUATORS

Ernst Weber, Mount Vernon, and John Ebert, Woodside, N. Y., assignors to Polytechnic Institute of Brooklyn, Brooklyn, N. Y., a corporation of New York Application November 2, 1946, Serial No. 707,468

2 Claims. (Cl. 333—81)

This invention relates to attenuators for wave guides, and it is concerned especially with impedance matching of the attenuator with respect to the wave guide to eliminate or reduce wave reflections from the attenuator.

An object of the invention is to devise arrangements for matching the input impedance of the attenuator to the characteristic impedance of the wave guide.

A further object is to devise a matched attenuator having a broad-band transmission characteristic.

The present invention may be applied to wave guides generally, with or without a center conductor. The attenuator unit comprises a relatively thin, loss-producing, plate-like element mounted within the wave guide longitudinally thereof and with its plane parallel with the plane of the electric lines within the wave guide. The attenuator plate is provided at one or both ends with means to match the input impedance with the characteristic impedance of the guide. The plate may be mounted for movement transversely of the wave guide to vary the amount of attenuation, or it may be mounted to enter the wave guide through a slot formed in the wall of the guide.

Various forms of the invention are illustrated in the accompanying drawing in which Figure 1 is a plan view, partly in section, showing one form of adjustable attenuator in which the attenuator plate moves transversely of the wave guide;

Figure 1:
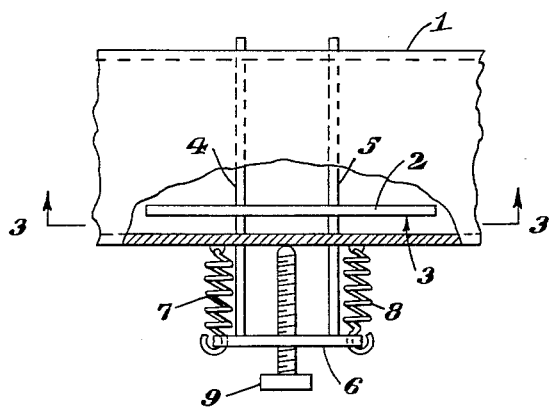

Referring to the drawing, 1 indicates a rectangular wave guide in which is mounted a flat plate 2 of dielectric material, such as glass. This plate carries on one face thereof a thin metallic coating indicated at 3, and the plate is mounted upon a pair of parallel rods 4 and 5 which pass through openings formed in opposite narrow walls of the wave guide. The rods 4 and 5 are bridged at one end by a plate 6 which is normally urged towards the wave guide by a pair of springs 7 and 8 secured to the plate at one end and secured to the wave guide at the other end. An adjusting screw 9 having threaded engagement with the plate 6 extends into contact with the adjacent wall of the wave guide and limits the amount of movement under the action of springs 7 and 8. By adjusting the screw 9, the position of the plate 2 within the wave guide may be varied, the plate remaining parallel with the longitudinal axis of the wave guide in all positions.

Figure 3:
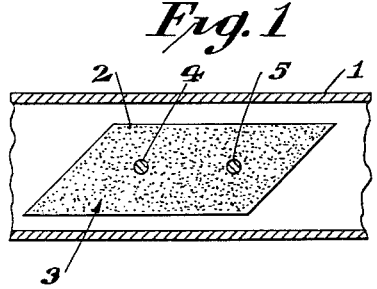
Figure 3 is a sectional view of Figure 1 taken along the line 3—3.

If the plate 2 were of rectangular shape and the film 3 were uniform throughout, wave reflection would be set up by the attenuator unit. In order to eliminate or substantially reduce this reflection, the ends of plate 2 are tapered as shown in Figure 3 to constitute transition sections which serve to match the input impedance of the attenuator unit with the characteristic impedance of the wave guide. In this form of the invention the film 3 on the plate 2 is uniform throughout the area of the plate.

The length of the taper required for best match will depend upon the center frequency and upon a number of things including the film resistance, the dielectric constant of the plate, and the thickness of the plate. In general, a thick plate of window glass will require a shorter matching section than a thin plate of "Pyrex," since both the greater thickness of the window plate and its higher dielectric constant shorten the guide wave length. Low resistance films require a longer taper than high resistance films on a similar plate of glass. In general, the length of the taper will be of the order of ¼ to ½ of the center wavelength of the guide.

Figure 2:
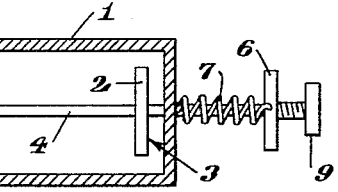
Figure 2 is an end view of Figure 1.

By way of example, a satisfactory attenuator unit according to Figures 1 to 3 for the free space band of 3.13 cm. to 3.53 cm. may be formed of soft window glass ⅟₁₆ inch thick and 0.375 inch wide with a 1½ inch taper at each end. With a film resistance of 80 ohms per square, the standing wave ratio is less than 1.1 over the entire band. The match was below 1.1 for all positions of the plate in the guide which measured 0.400" x 0.900" (inside). The length of the untapered section is dependent upon the amount of attenuation wanted. For narrow band applications, the length of the taper sections may be reduced.

Varying the position of the attenuator plate 2 within the wave guide causes variation in the amount of attenuation. The attenuation is very low when the plate is positioned closely adjacent the side wall of the wave guide, and it increases in value as the plate moves away from the wall. In the example given above the attenuation reaches a maximum value when the plate 2 is positioned about ¼ inch from the adjacent wall.

For any given length of attenuator plate, the attenuation increases as the width of the plate is increased, except where the gap between the edges of the plate and the wall of the guide becomes small.

Figure 4:
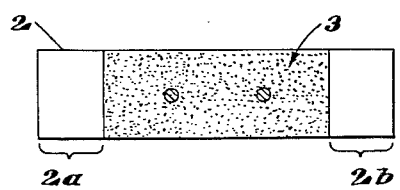

Figure 4 illustrates a different arrangement for matching the attenuator. In this arrangement, the plate 2 is of rectangular form and the attenuator film 3 covers a central portion of one face of the plate, leaving the end portions 2a and 2b blank, and these blank portions serve as matching or transition sections. The presence of the blank glass in the guide locally changes the characteristic impedance. This difference in characteristic impedance, together with the effective reactance provided by the shunt field distortion at the front edge of the glass is capable of producing the necessary match.

A satisfactory attenuator unit according to Figure 4, and useful in the above-mentioned band, may be formed of a rectangular glass plate having a length of 5.46 cm., a width of 0.375 inch and a thickness of 0.065 inch. The film 3 has a length of 4.52 cm., leaving blank sections at each end of a length of 0.47 cm. The film has a resistance of 80 ohms per square. The input VSWR for this unit was in the neighborhood of 1.2 for all wave lengths within the band when used in a guide measuring 0.400" x 0.900" inside.

For the unit shown in Figure 4, the glass thickness and dielectric constant, the film resistance, and the length of the transformer section are the important factors. In practice, the glass thickness and the dielectric constant are usually fixed or variable over a very small range. Accordingly, the film resistance and the transformer length are the two quantities that must be determined.

Figure 5:
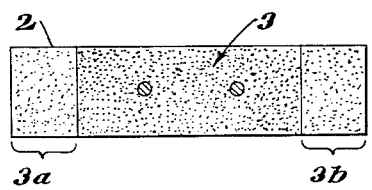

A modification of the arrangement of Figure 4 is illustrated in Figure 5. In this unit the plate 2 is rectangular in shape and the entire length of one face is provided with a metallic film, the central section 3 of the film being of greater thickness than the end sections 3a and 3b. This unit has a complex characteristic impedance. The high resistance film sections 3a and 3b act as complex impedance transformers in the same sense as the blank glass sections 2a and 2b of Figure 4, but with a pronounced loss effect. The loss produced in matching sections 3a and 3b makes the arrangement of Figure 5 less critical with respect to frequency than the arrangement of Figure 4. Both arrangements of Figures 4 and 5 have the advantage of being considerably shorter than Figure 3.

For use in the band mentioned above, it has been found that an arrangement according to Figure 5 is satisfactory where formed on thin "Pyrex" glass of a thickness of 0.038 inch where the main film 3 has a resistance of approximately 140 ohms per square and the transformer sections have a length of 0.30 inch with a film resistance of approximately 400 ohms per square.

Figure 6:
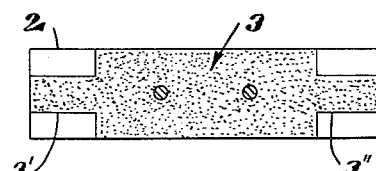
Figures 4, 5 and 6 are side elevational views of modified forms of attenuator units useful in Figure 1.

Figure 6 shows still another arrangement of transition sections for the attenuator unit. In this arrangement, the plate 2 is of rectangular shape and the attenuator film 3 covers a central section of the plate and is provided at each end with narrow tongues shown at 3' and 3". The film is of uniform thickness throughout, but the narrow tongues serve as matching sections. These tongues may be formed by suitably masking the four corners of the plate 2 while the metallic film is being deposited on the plate, preferably by a process of thermal evaporation and disclosed in the copending application Serial No. 699,546, filed September 26, 1946, now Patent No. 2,586,752. The arrangement of Figure 6 has very good broad-band characteristics, and it also is satisfactory from a manufacturing standpoint, since the entire film may be formed in one coating operation. The tongue width and length are fixed to give the best match over the desired frequency range. Figure 6 also gives a shorter arrangement than Figure 3.

For use in the above mentioned guide and band, a satisfactory attenuator unit according to Figure 6 may be formed on a thin "Pyrex" plate of a thickness of 0.038 inch, a length of 5.1 cm. and a width of 0.363 inch. The length of the tongue is 0.242 inch, and the width is 0.160 inch. The resistance of the film is 140 ohms per square.

In the case of Figure 5, each matching section may have different linear sections formed with different resistance values, and in the case of Figure 6, each matching tongue may have different widths in different linear sections thereof.

Figure 7:
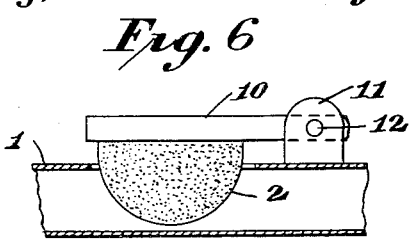
Figure 7 is a side view partly in section of a second form of variable attenuator in which the attenuator unit enters the wave guide through a slot in the broad face thereof.

The arrangement illustrated in Figure 7 involves a variation of the taper match shown in Figure 3. In this case the attenuator plate is formed of generally semicircular shape, and the rounded ends of the plate located within the guide serve to match the input impedance of the attenuator unit with the characteristic impedance of the guide. The film on the plate 2 in Figure 7 is of uniform thickness throughout.

Figure 7 also illustrates another way of mounting the attenuator unit for obtaining adjustment of the amount of attenuation. In this arrangement the plate 2 is secured in a slot formed in a bar 10, as by cementing, and the bar 10 is pivotally supported between a pair of brackets 11 on a pivot pin 12. Any suitable means may be employed for adjustably moving and holding the bar 12 in different angular positions about the pin 12, to thereby vary the extent to which the plate 2 enters the wave guide. It will be understood that the plate 2 is positioned to enter a longitudinal slot formed in the broad face of the wave guide 1.

Figure 8:
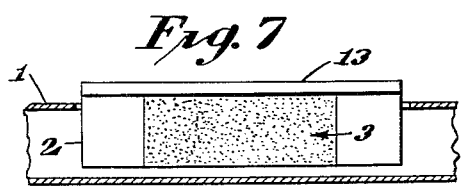
Figure 8 is a side view, partly in section, showing a third form of attenuator.

Figure 8 illustrates another variable attenuator of the same general type as Figure 7 in which the attenuator unit has the same construction as shown in Figure 4 but is mounted within a longitudinal slot formed in the wave guide. The attenuator unit in Figure 8 is supported from a bar 13 which may be moved vertically by any suitable means to vary the amount of penetration of the attenuator plate into the wave guide.

Figure 9:
Figure 9 is a side elevational view of an attenuator unit useful in Figure 8.

Figure 9 illustrates an attenuator unit provided with matching sections like that shown in Figure 5 and mounted upon a bar 13 to be used in the arrangement of Figure 8.

In the foregoing discussion of Figures 1 to 3 it was pointed out that the amount of attenuation is dependent upon the width of the attenuator film. The arrangements illustrated in Figures 7 and 8 are designed to vary the effective width of the film within the wave guide and thereby vary the amount of attenuation.

The preferred method of forming the metallic film on the attenuator units embodied in this invention is by thermal evaporation as disclosed in the copending application Serial No. 699,546, filed September 26, 1946, now Patent No. 2,586,752, since this process produces highly stable films, although other processes may be used if desired. Also, it is obvious that instead of using a film on a dielectric plate, the plate itself may be formed of loss-producing material, and this would apply especially to units like those shown in Figures 3, 5, 6 and 7. In the case of Figure 5, the matching sections 3a and 3b would be formed of gradually decreasing thickness.

While the invention has been illustrated herein as applied to a rectangular wave guide, it is obvious that it may be applied to guides of other shapes where the electric field lines are essentially parallel over a certain region. The attenuators may be used in wave guides of the coaxial type and they need not be variable.

Certain subject matter disclosed herein is being claimed in co-pending applications Serial No. 277,176, filed March 18, 1952, and 336,264, filed February 11, 1953.

We claim:
1. An attenuator for a wave guide comprising an elongated plate of dielectric material mounted within said guide with its plane parallel to the electric field therein, a relatively thin metallic film carried on one face of said plate and extending throughout the area of the broad face of said plate, and means at each end of said plate for matching the input impedance of the attenuator unit to the characteristic impedance of said guide comprising end portions of said plate of gradually decreasing width.

2. An attenuator comprising a section of rectangular wave guide of unequal transverse dimensions, a relatively thin plate of dielectric material carrying on at least one broad face thereof, a loss-producing coating, said plate being mounted within said guide section longitudinally thereof and with its plane parallel with the short transverse dimension of said guide, and at least one end of said plate being tapered in its broad transverse dimension to reduce reflection.

References Cited in the file of this patent

UNITED STATES PATENTS

| | | |
|---|---|---|
| 2,151,157 | Schelkunoff | Mar. 21, 1939 |
| 2,505,557 | Lyman | Apr. 25, 1950 |
| 2,594,978 | Nelson | Apr. 29, 1952 |
| 2,600,466 | Bowen | June 17, 1952 |

OTHER REFERENCES

"Techniques and Facilities for Microwave Radar Testing," A. I. E. E. Technical Paper No. 46–40, published January 1946 by American Institute of Electrical Engineers, 33 West 39th St., New York, N. Y. Received in Division 65, Feb. 18, 1946. The above paper also appears in "Electrical Engineering," published by the above, vol. 65, No. 5, May 1946, Transaction section pages 274 to 290. Page 22 and Figs. 5 and 23 (three pages total) of Paper No. 46–40 or pages 277, 286 and 287 of the "Electrical Engineer" article relied on.